(12) United States Patent
Montroy et al.

(10) Patent No.: US 7,721,225 B2
(45) Date of Patent: May 18, 2010

(54) SYSTEM AND METHOD FOR CREATING AND PRESENTING MODAL DIALOG BOXES IN SERVER-SIDE COMPONENT WEB APPLICATIONS

(75) Inventors: Daniel Montroy, Sandy, UT (US); Micah Gorrell, Spanish Fork, UT (US); Matthew Sorensen, Lehi, UT (US)

(73) Assignee: Novell, Inc., Provo, UT (US)

( * ) Notice: Subject to any disclaimer, the term of this patent is extended or adjusted under 35 U.S.C. 154(b) by 1084 days.

(21) Appl. No.: 11/119,825

(22) Filed: May 3, 2005

(65) Prior Publication Data

US 2006/0253799 A1 Nov. 9, 2006

(51) Int. Cl.
*G06F 3/00* (2006.01)

(52) U.S. Cl. .................. 715/809; 715/760; 715/781; 715/733; 715/234

(58) Field of Classification Search .............. 715/733, 715/760, 764, 765, 766, 767, 768, 781, 783, 715/790, 794, 802, 809, 853, 975, 200, 205, 715/234
See application file for complete search history.

(56) References Cited

U.S. PATENT DOCUMENTS

| | | | | |
|---|---|---|---|---|
| 6,407,759 | B1 | 6/2002 | Kanungo et al. | 345/809 |
| 7,100,195 | B1* | 8/2006 | Underwood | 726/2 |
| 2002/0023057 | A1* | 2/2002 | Goodwin et al. | 705/50 |
| 2002/0166000 | A1* | 11/2002 | Rossi et al. | 709/328 |
| 2003/0007004 | A1* | 1/2003 | Kanungo et al. | 345/762 |
| 2003/0020756 | A1* | 1/2003 | Bates et al. | 345/788 |
| 2003/0084087 | A1* | 5/2003 | Berry | 709/102 |
| 2003/0218636 | A1* | 11/2003 | McIntyre et al. | 345/809 |
| 2004/0056900 | A1* | 3/2004 | Blume | 345/807 |
| 2004/0098349 | A1* | 5/2004 | Tolson | 705/64 |
| 2004/0268225 | A1* | 12/2004 | Walsh et al. | 715/501.1 |
| 2005/0039191 | A1* | 2/2005 | Hewson et al. | 719/317 |
| 2005/0120308 | A1* | 6/2005 | Gibson et al. | 715/779 |
| 2005/0160322 | A1* | 7/2005 | West et al. | 714/38 |
| 2005/0257167 | A1* | 11/2005 | Fraleigh et al. | 715/809 |
| 2008/0016459 | A1* | 1/2008 | Mann et al. | 715/781 |
| 2008/0114709 | A1* | 5/2008 | Dixon et al. | 706/13 |

OTHER PUBLICATIONS

"The Forms of a Database Application: Dialog Boxes", 2005, VBA for MS Access, Lesson 10: The Forms of a Database, http://www.functionx.com/ybaccess/Lesson10d.htm, 3 pages.*
"Cross Browser DHTML Modal Dialogs for Web Apps", Sublog, printed from http://subimage.com/sublog/subModal, printed on Mar. 24, 2005, 4 pages.

* cited by examiner

*Primary Examiner*—X. L Bautista
(74) *Attorney, Agent, or Firm*—Pillsbury Winthrop Shaw Pittman LLP

(57) ABSTRACT

A system and method for creating and presenting modal dialog boxes in web-based applications is presented herein. The invention includes client devices that initiate requests for webpages that include modal dialog boxes and a server that receives and processes the web page requests and includes modal dialog controls to generate HTML instructions to render and display the modal dialog boxes at the client devices. The modal dialog controls include a web rendering module to determine the existence of children controls within the modal dialog box and to generate display related information. The modal dialog controls also include an event handling module to intercept attempts to access elements of the web page while the modal dialog box has not been responded to.

20 Claims, 5 Drawing Sheets

SYSTEM AND METHOD FOR CREATING AND PRESENTING MODAL DIALOG BOXES IN SERVER-SIDE COMPONENT WEB APPLICATIONS

FIELD OF THE INVENTION

The invention relates to a system and method for creating and displaying modal dialog boxes for web-based applications.

BACKGROUND OF THE INVENTION

Generally, web pages are developed by employing Hyper-Text Markup Language (HTML) code to specify how content is to be formatted and displayed by a web browser. In the past, web pages were only capable of containing "static" HTML codes, that is, content that is read directly from a file. A web server would then merely find the file corresponding to the web page's associated Uniform Resource Locator (URL) requested by the web browser, and return the contents of that file.

Eventually, the needs of the web demanded more dynamic content, which could not be generated with static HTML files. As such, the use of server-side programming evolved. With server-side programming, a web server could be adapted to respond to a request for a web page by running codes at the server in order to generate the HTML output that would be rendered to the web browser.

While server-side programming enabled the creation of dynamic web pages that were not previously available with static HTML programming, programmers also needed the ability to encapsulate the contents of a web page into more logical and reusable components. To help with this functionality, the concept of server-side web controls was introduced. Web controls are logical components that are hierarchically arranged on the web page. Each control has the responsibility of rendering specific HTML content. While web controls exist for creating many elements, such as, for example, labels, text boxes, and buttons, no web controls exist for creating modal dialog boxes at the server.

Modal dialog boxes are a common tool for building applications. Modal dialog boxes are generally presented as popup windows having informational inquiries that force a user to respond before allowing the user to interact with other controls in the application. Furthermore, modal dialog boxes allow applications to present a new user interface without taking away the user interface that is currently viewable. Modal dialog boxes are generally configured to remain on top of other windows within the application, until they are dismissed by performing the required action.

Attempts have been made to use modal dialog boxes for web-based applications. One such attempt uses a Javascript library running on a client device. HTML programming is used to generate a webpage and to call scripts from the library to generate a popup dialog. However, this method does not incorporate the use of web controls, as is commonly used in modern web application design. Furthermore, separate requests must be sent back to the server for the dialog and for the controls displayed on the main page. These and other drawbacks currently exist regarding the creation and display of modal dialog boxes for web-based application.

SUMMARY OF THE INVENTION

A system and method for creating and displaying modal dialog boxes in web-based application is present herein. The system includes one or more client devices configured to initiate a request for one or more web pages and a server mechanism communicatively coupled to the one or more client devices and configured to receive the request and generate HTML code to render the web pages. The web server includes one or more web controls configured to provide the necessary elements to render the requested web page.

One such web control is a modal dialog control. According to various embodiments of the invention, the modal dialog control includes a web rendering module for generating HTML code to display the modal dialog box and an event handling module to intercept attempts to access control elements associated with the requested web page.

According to some embodiments of the invention, the web server may receive a request to generate a web page from a client device. The web server may then process the request provided by the client device and generate a control tree indicating the content and controls needed to render the web page. If the web page includes a modal dialog box to be displayed, a modal dialog control is included.

HTML code may be generated by the web server based on the control tree, and the HTML code may be sent to the client device to render the requested web page. The modal dialog control may generate HTML code to position the modal dialog box above any associated web pages or other modal dialog boxes.

The modal dialog control may also generate HTML code to provide a transparent image object situated above any associated web pages or applications but below the modal dialog box to intercept mouse attempts to access the associated web pages. A hidden control may be included within the modal dialog box to intercept attempts to tab to controls outside of the modal dialog box.

According to some embodiments of the invention, when the modal dialog box is responded to and dismissed, a message is posted back to the web server that includes the values associated with the controls within the modal dialog box as well as associated web pages.

DETAILED DESCRIPTION OF PREFERRED EMBODIMENTS

In accordance with the various disclosed embodiments, the present invention contemplates systems and methods that employ server-side programming techniques to create and present modal dialog boxes for web-based applications.

Figure 1:
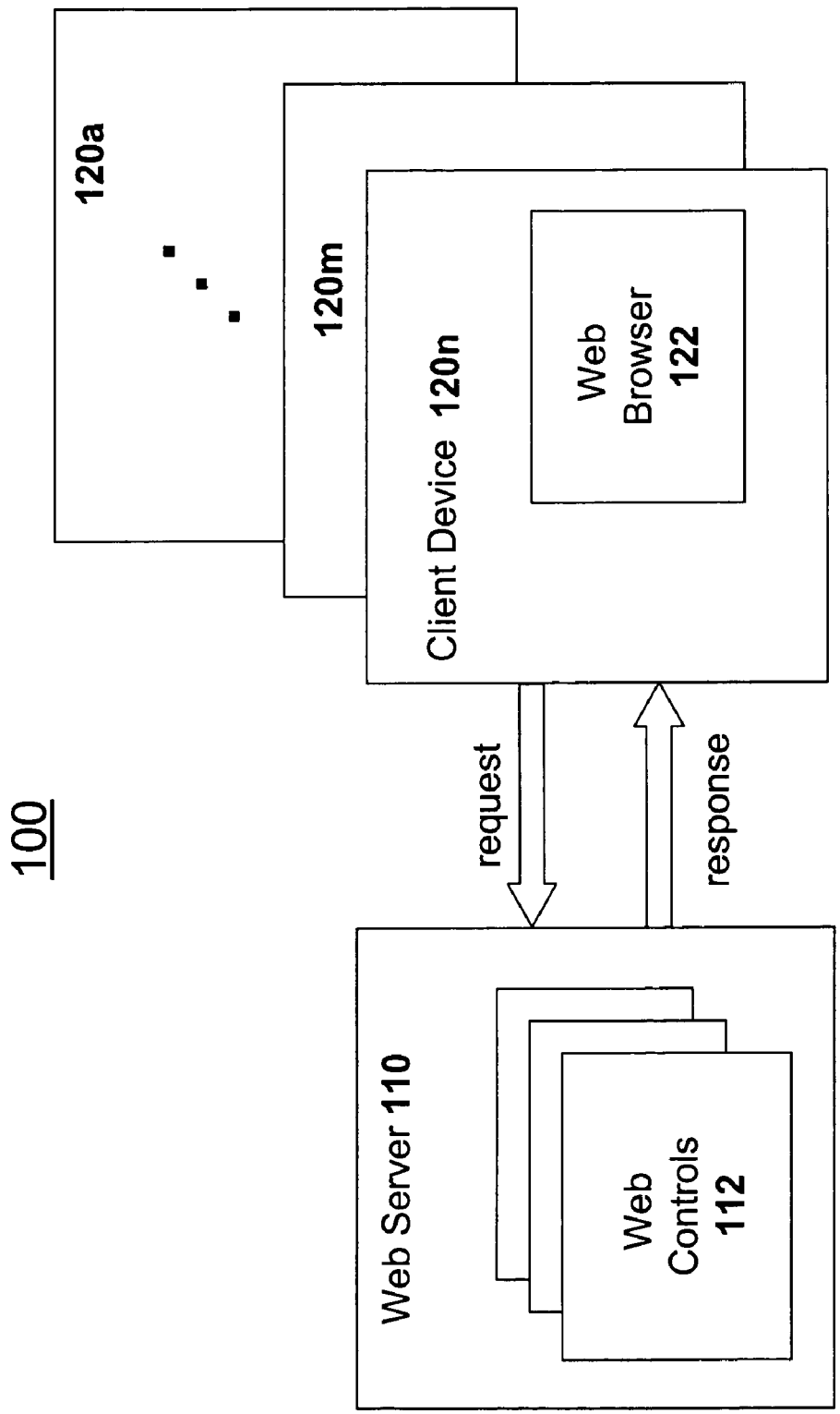
FIG. 1 illustrates a client-server network system, in accordance with an embodiment of the present invention.

Consistent with these embodiments, FIG. 1 depicts system 100 comprising a web server 110 that is communicatively coupled to one or more client devices 120a-120n. Each client device 120n includes a web browser 122.

Client device 120*n* may comprise any network device, such as, for example, a desktop or laptop computer, a PDA, a web enabled wireless or cellular phone, and/or any other electronic device capable of accessing a network through a web browser. Web browser 122*n* may be any known Internet browser, such as, for example, Internet Explorer, Netscape, Mozilla, and/or other browsers.

Web server 110 is configured to receive requests from client device 112*n* to present a web page. The request typically includes the URL that identifies the requested web page. Web server 110 may then generate the HTML code needed to render the webpage and transmit the HTML code to client device 120*n* to display the web page on web browser 122.

As illustrated in FIG. 1, web server 110 may include one or more web controls 112. Web controls 112 are logical, reusable components used to render specific HTML content. For example, web controls 112 may be used to render an overall web page, textbox, dropdown list, and/or other HTML content. Web controls 112 may be simple controls, presenting only the specified content, or may contain other controls. That is, web controls 112 may include a container control that contains a plurality of components and elements associated with the web page.

Figure 2:
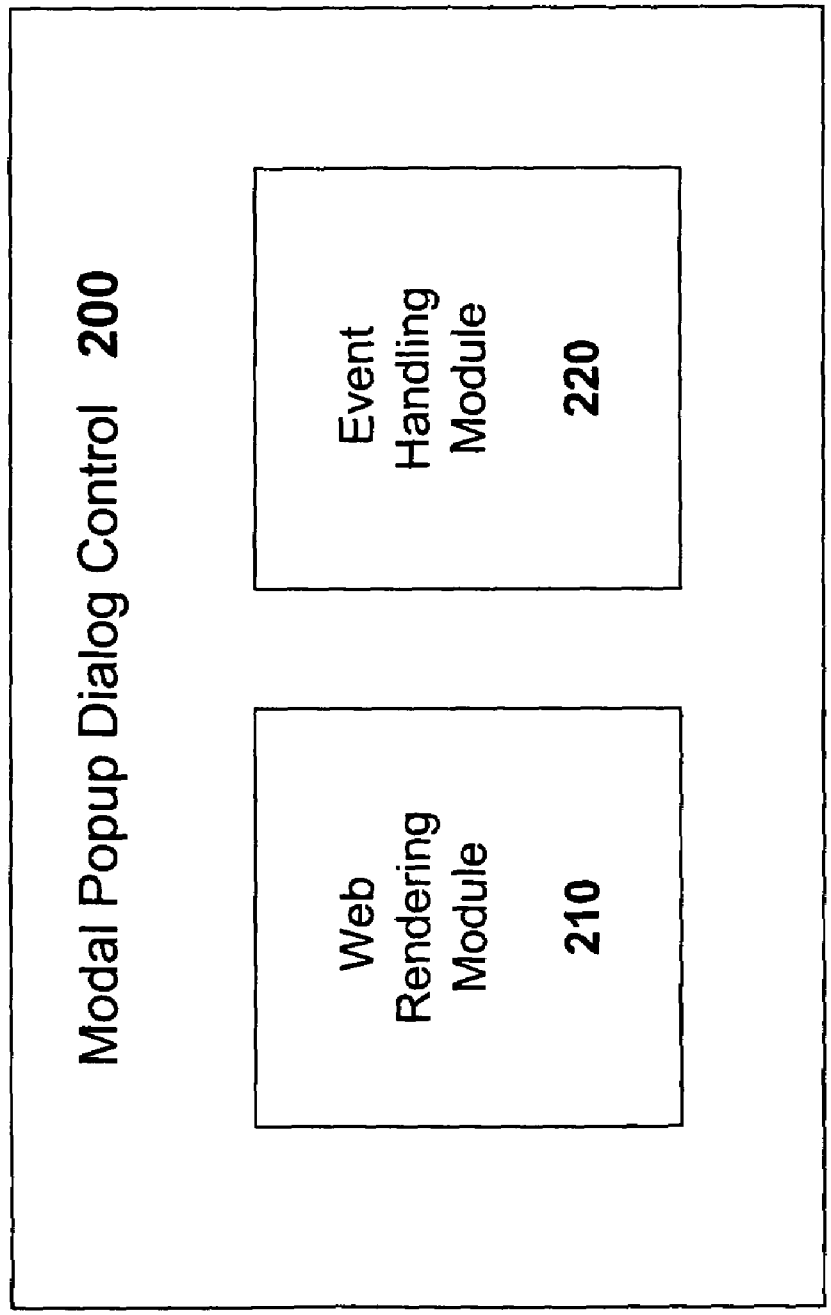
FIG. 2 illustrates modal dialog control associated with a web server, in accordance with an embodiment of the invention.

As noted above, modal dialog boxes are used for presenting informational inquiries that should be responded to before interacting with other areas of a web page or other currently executing applications or windows associated with the modal dialog box. As such, web controls 112 include a modal dialog control 200 as shown in FIG. 2, in accordance with various embodiments of the invention. The modal dialog control 200 may be a container control having a one or more children controls, for example, buttons or textboxes. Modal dialog control 200 may also include one or more modules for generating and presenting modal dialog boxes.

As indicated in FIG. 2, modal dialog control 200 may include a web rendering module 210 configured to generate HTML code to display a modal dialog box and to disable access to other areas of the web page or other currently executing applications associated with the modal dialog box until the content of the modal dialog box has been responded to.

Though web rendering module 210 may disable access to web pages or applications associated with the modal dialog box, a user may still attempt to access the associated web pages or applications. As such, an event handling module 220 may also be provided to intercept any user initiated activity that attempts to access the associated web pages or applications, such as, for example, mouse clicks or keyboard entries.

Figure 3:
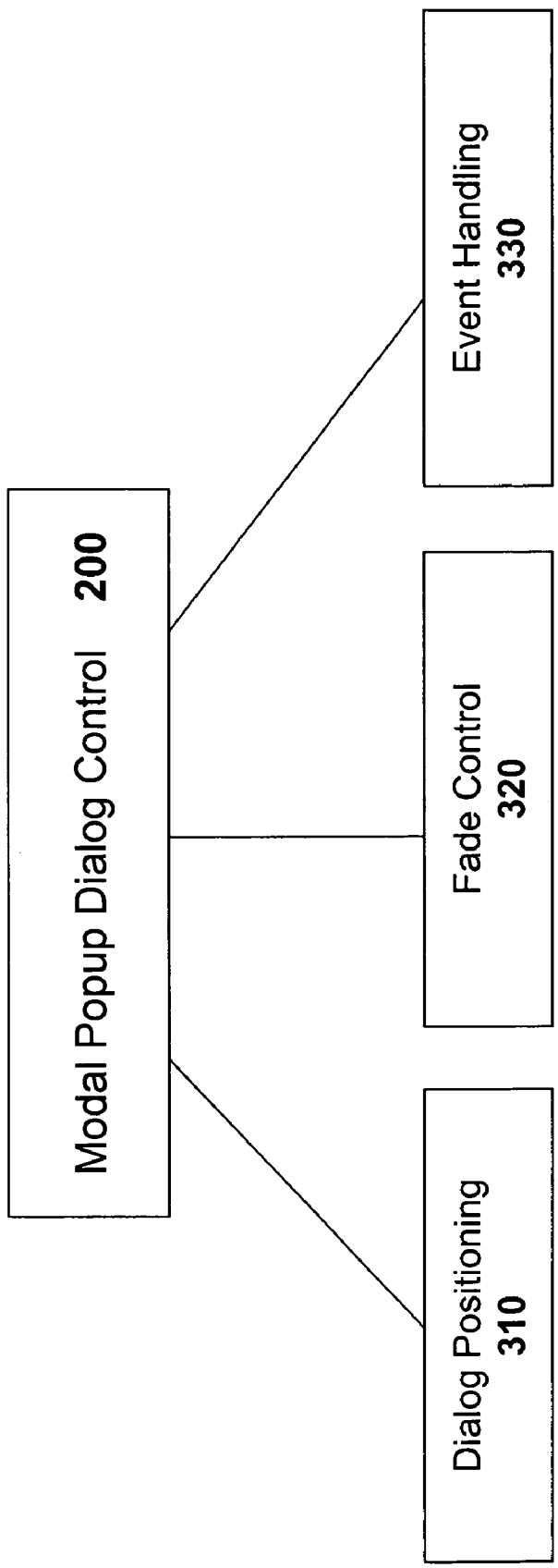
FIG. 3 depicts actions that may be performed to render a modal dialog box, in accordance with an embodiment of the invention.

In operation, modal dialog control 200 may present a modal dialog box by performing several actions, as depicted in FIG. 3. In particular, modal dialog control 200 may be configured to cause the modal dialog box to be positioned on the screen, as depicted at 310, to cause associated web pages or applications to be faded and/or grayed out, as depicted at 320, and/or to handle events designed to access associated web pages or applications, as depicted at 330. It will be appreciated that other actions, consistent with the embodiments of the invention, may be performed by modal dialog control 200.

Regarding the positioning of the modal dialog box, as shown at 310, modal dialog control 200 may include tables to facilitate the positioning of the display of the modal dialog box in the currently viewable area. That is, a web page may be larger than the current size of the browser display area so that the user may be seeing only a portion of the webpage. As such, a modal dialog box may be absolutely positioned by assigning it coordinates relative to a corner of the browser window in a table. For example, the modal dialog box may be centered within the viewable area by calculating the center point of the viewable area.

A modal dialog box may also be rendered as a DIV HTML element. DIV HTML elements are elements that encapsulate one or more HTML elements. In one embodiment, a DIV element may be used to contain the content of a modal dialog box and to position the dialog box. The DIV element may be rendered as a part of the content of the web page, creating a window with features that a user can interact with, such as, drag, close, etc.

As discussed above, modal dialog boxes present information that should be addressed before interacting with the associated web pages or applications. Thus, according to various embodiments of the invention, modal dialog control 200 may be configured to cause other windows to become unavailable. To achieve this, the present invention employs an index (e.g., Z-index) that sets the stack order of an element in a manner in which an element with a greater stack value is always in front of another element with a lower stack value. Thus, to ensure that the modal dialog box appears in front of other content, including other controls, elements, or windows, its Z-index is set above the base content.

Regarding the fade control of other elements, as shown at 320, modal dialog control 200 may be configured to create a transparent image object that appears behind the modal dialog box, but in front of all other content. As such, the Z-index of the transparent image may be set to a value lower than that of the modal dialog box, but higher than that of all other content. The transparent image object may also be sized to cover the entire web application.

According to some embodiments of the invention, modal dialog control 200 may be configured to introduce a gray tint to the transparent image object to indicate to the user that all other windows are disabled. Modal dialog control 200 may also be configured to may also generate a fading effect with the transparent image by slightly changing the tint over time, to reconfirm to the user that the content below the modal dialog box is unavailable.

Regarding the handling of events designed to access other windows, as shown at 330, it will be appreciated that, while the transparent image object prevents access to content below a modal dialog box, users often continue to make attempts to access this content. For example, a user may attempt to click on elements on an associated web page or application below the active modal dialog. As such, modal dialog box control 200 may be configured to intercept mouse click events by having the transparent image object receive the events so that the controls associated with the contents below the transparent image object are not actuated or processed.

Similarly, users may also attempt to bypass a modal dialog box by initiating keyboard actions, such as tabbing to controls outside the modal dialog box. According to an embodiment of the invention, modal dialog box control 200 may be configured to provide a hidden control placed at the bottom of the modal dialog box. The hidden control may be configured to move focus to the top of the modal dialog box whenever it receives focus. Thus, a user may tab through all visible controls in the modal dialog box, but is prevented from tabbing to controls outside of the modal dialog box.

Figure 4:
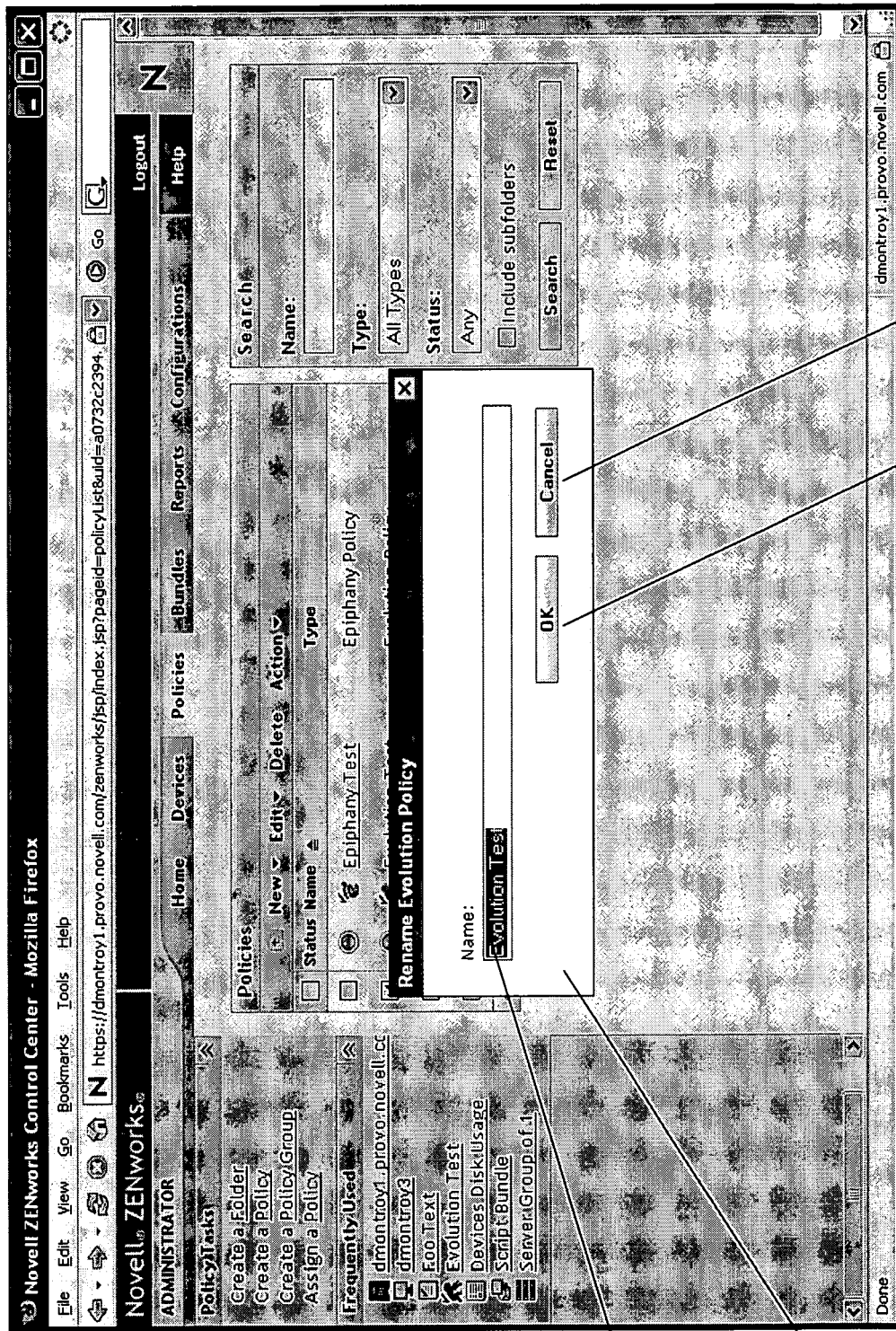
FIG. 4 illustrates a web page including a modal dialog box, in accordance with an embodiment of the invention.

FIG. 4 illustrates, by way of example, a web page 410 and a modal dialog box 420. Modal dialog box 420 comprises several visible controls, including a text box 422 and buttons 423 and 424. Modal dialog box 420 may also include one or more hidden controls, preventing a user from tabbing to controls located on web page 410. Web page 410 is shaded gray, indicating that the controls on web page 410 are not accessible.

In the illustrated example, a user may respond to, and thus dismiss the modal dialog box 420 by entering information into text box 422 and selecting button 423, or by selecting button 424 to cancel the operation. Modal dialog box 420 may also include the familiar "X" box, provided in the upper right corner of modal dialog 420. Selecting this button also causes modal dialog 420 to be closed.

At times, more than one modal dialog may need to be displayed. For example, selecting an option or entering information in one modal dialog box may cause a second modal dialog to be displayed. According to an embodiment of the invention, modal dialog box control 200 may be configured with the capability of creating and displaying multiple modal dialog boxes. Dialog box control 200 would determine which dialog box should be the active dialog and all other windows, including other modal dialog boxes, are rendered inaccessible.

As noted above, for each modal dialog box to be displayed, dialog box control 200 centers the modal dialog box within the viewable area of the screen. The system also creates a transparent image object that overlays any windows below the active modal dialog box. This transparent image retrieves any mouse clicks intended to access windows below it. As such, only the active modal dialog box is accessible.

Figure 5:
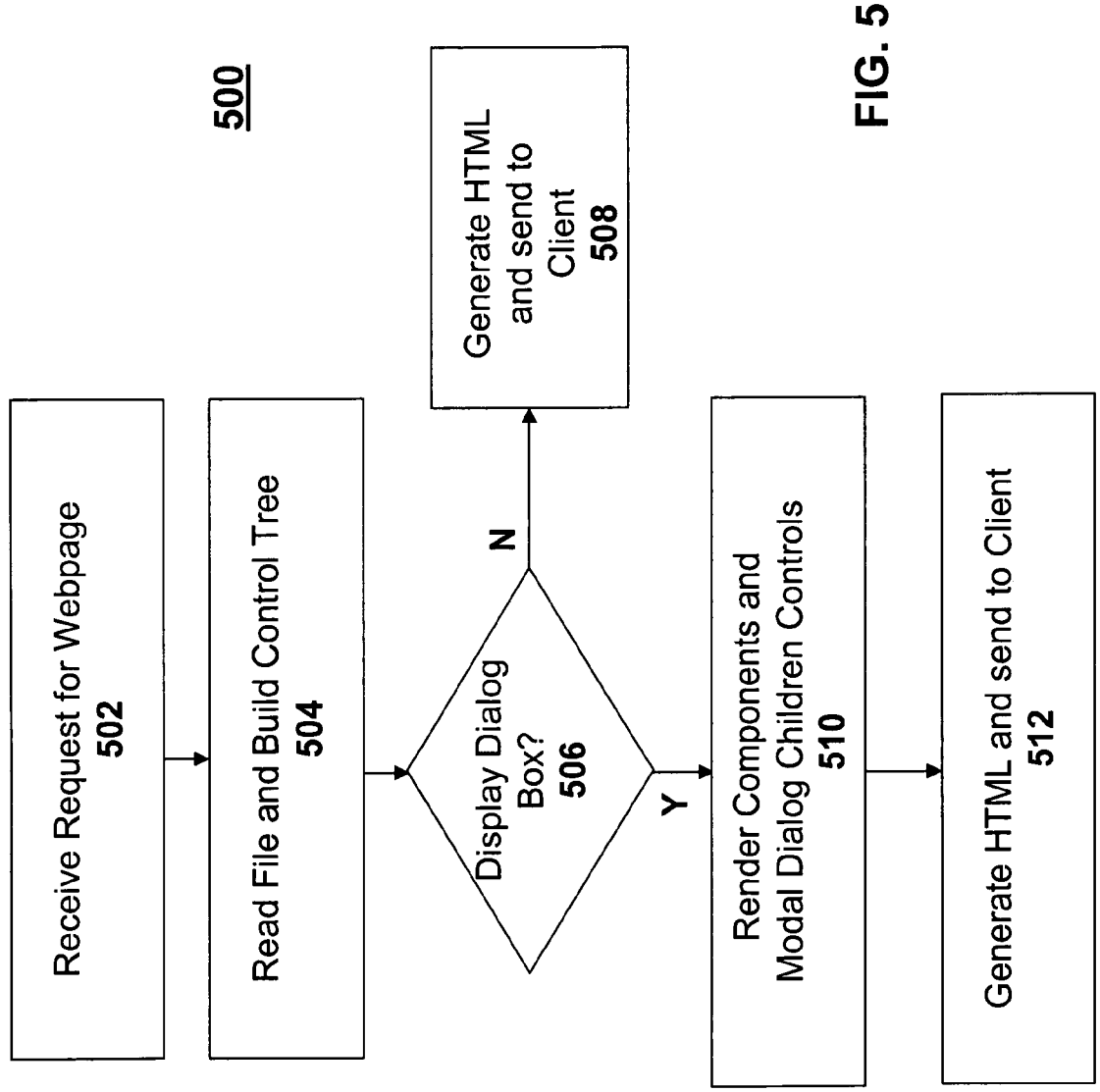
FIG. 5 illustrates a process associated with the generation of a web page, in accordance with an embodiment of the invention.

FIG. 5 depicts a process 500 for rendering a web page which includes one or more modal dialog boxes. As depicted at 502, web server 110 may receive a request from a client device 120n to render a web page. The request may include a URL or other indicia containing the instructions needed to display the page.

Consistent with embodiments of the present invention, server-side programming techniques may be used to render the web page. As depicted at 504, web server 110 interprets and processes the request, including building a control tree. The control trees indicate the one or more controls required to generate the HTML content consistent with the request.

A determination may be made, as depicted at 506, as to whether a modal dialog box should be initially displayed. If the modal dialog box is not to be initially displayed, the HTML code for all controls in the control tree is generated and sent to the client device 120n, as depicted at 508.

If a modal dialog box is to be displayed initially, components to be displayed within the modal dialog box are rendered, as depicted at 510. As described above, the modal dialog box control may include one or more children controls. These children controls may be textboxes, buttons, and/or other controls. As such, the children controls are also rendered, as indicated at 510.

The HTML code for all controls may then be generated and transmitted to the client device 120n, as depicted at 512. Once the client device 120n has received the HTML code, the web browser 122 may parse the code and illustrate the webpage. If a modal dialog box is visible, the dialog box is displayed and other windows are made inaccessible in the manner described above. When the modal dialog box is responded to, a message is transmitted back to web server 110 (i.e., post) indicating the modal dialog box has been responded to, and consequently dismissed. The server 110 may then update the control tree and refresh the web page, as needed. Because the modal dialog box and the underlying webpages are integrated, the post to web server 110 communicates the status of all of the displayed controls to server 110, regardless of whether those controls appear in a dialog box or on the underlying web page or application.

Modal dialog boxes are often displayed as the result of a user selecting a link on a webpage. The link may be located on a portion of the page that is not seen when the page is initially rendered. Thus, the user may have to scroll to the bottom of a page to reach a particular link or other object. When a user selects an object that generates a modal dialog box, a post may be made to server 110. By default, when the new page is returned, the user is scrolled back to the top of the page. Thus, the user would be required to navigate back to their pre-post viewing position.

According to an exemplary embodiment of the invention, the coordinates of the current display position are saved prior to posting to the server 110. When the page is reloaded, the scroll position may be restored automatically.

Other embodiments, uses, and advantages of the invention will be apparent to those skilled in the art from consideration of the specification and practice of the invention disclosed herein. This specification should be considered exemplary only, and the scope of the invention is accordingly intended to be limited only by the following claims.

What is claimed is:

1. A method for creating and presenting one or more modal dialog boxes in a web-based application via one or more server-side web controls, the method comprising:
   receiving, at a server from a client device, a request for a web page that includes one or more modal dialog boxes and one or more control elements that render HTML content outside the one or more modal dialog boxes, wherein the one or more modal dialog boxes require a response to at least one informational inquiry displayed in the modal dialog boxes;
   generating, at the server, HTML instructions to render the requested web page that includes the one or more modal dialog boxes and the one or more control elements, wherein generating the HTML instructions to render the requested web page includes generating, via one or more server-side modal dialog web controls at the server, HTML instructions to:
     display the one or more modal dialog boxes on a screen at the client device;
     position the displayed one or more modal dialog boxes on the screen;
     disable access to the control elements in the requested web page that render the HTML content outside the one or more modal dialog boxes until the one or more modal dialog boxes have received the required response to the at least one informational inquiry displayed in the modal dialog boxes; and
     enable access to the control elements that render the HTML content outside the one or more modal dialog boxes in response to the one or more modal dialog boxes receiving the required response to the at least one informational inquiry; and
   sending, by the server, the generated HTML instructions to the client device, wherein the client device renders the requested web page that includes the one or more modal dialog boxes and the one or more control elements in response to receiving the generated HTML instructions from the server.

2. The method of claim 1, wherein generating the HTML instructions to position the displayed one or more modal dialog boxes on the screen further comprises generating HTML instructions to:
   determine a viewable area associated with the screen at the client device; and
   calculate a position for displaying the one or more modal dialog boxes relative to the viewable area, wherein the generated HTML instructions position the displayed one or more modal dialog boxes on the screen at the calculated position.

3. The method of claim 2, wherein the calculated position for displaying the one or more modal dialog boxes comprises a center point of the viewable area.

4. The method of claim 1, wherein generating the HTML instructions to disable access to the control elements that render the HTML content outside the one or more modal dialog boxes further comprises generating HTML instructions to:
assign a first index having a first value to the one or more modal dialog boxes;
assign a second index having a second value to one or more of the control elements in the requested web page or the HTML content that the control elements render outside the modal dialog boxes, wherein the first value for the first index is greater than the second value for the second index; and
present an object to indicate that the control elements in the requested web page have been disabled, wherein a third index assigned to the object has a third value that is less than the first value for the first index and greater than the second value for the second index.

5. The method of claim 4, wherein the presented object includes a transparent image object that appears behind the one or more modal dialog boxes and includes a gray tint to visually indicate that the control elements in the requested web page have been disabled, wherein the transparent image object intercepts any attempts to access the disabled control elements in the requested web page until the modal dialog boxes have received the required response to the informational inquiry.

6. The method of claim 1, wherein generating the HTML instructions to disable access to the control elements that render the HTML content outside the one or more modal dialog boxes further comprises generating HTML instructions to insert a hidden control object within the one or more modal dialog boxes, wherein the hidden control object intercepts any attempts to access the disabled control elements in the requested web page until the modal dialog boxes have received the required response to the informational inquiry.

7. The method of claim 1, wherein generating the HTML instructions to disable access to the control elements that render the HTML content outside the one or more modal dialog boxes further comprises generating HTML instructions to:
determine that the modal dialog boxes include a plurality of modal dialog boxes;
assign a first index having a first value to an active one of the plurality of modal dialog boxes;
assign a second index having a second value to the remaining modal dialog boxes; and
assign a third index having a third value to one or more of the control elements in the requested web page or the HTML content that the control elements render outside the modal dialog boxes, wherein the first value for the first index is greater than the second value for the second index, and wherein the second value for the second index is greater than the third value for the third index.

8. The method of claim 1, further comprising receiving, at the server, a message from the client device indicating that the one or more modal dialog boxes have received the required response, wherein the message includes one or more control values associated with the modal dialog boxes and the requested web page.

9. A system for creating and presenting one or more modal dialog boxes in a web-based application via one or more server-side web controls, the system comprising:
at least one client device configured to initiate a request for a web page that includes one or more modal dialog boxes and one or more control elements that render HTML content outside the one or more modal dialog boxes, wherein the one or more modal dialog boxes require a response to at least one informational inquiry displayed in the modal dialog boxes; and
a server communicatively coupled to the client device, wherein the server includes one or more processors configured to:
receive the request for the web page that includes the one or more modal dialog boxes and the one or more control elements that render the HTML content outside the one or more modal dialog boxes;
generate HTML instructions to render the requested webpage that includes the one or more modal dialog boxes and the one or more control elements via one or more server-side modal dialog web controls, wherein the generated HTML instructions include HTML instructions to:
display the one or more modal dialog boxes on a screen at the client device;
position the displayed one or more modal dialog boxes on the screen;
disable access to the control elements in the requested web page that render the HTML content outside the one or more modal dialog boxes until the one or more modal dialog boxes have received the required response to the at least one informational inquiry displayed in the modal dialog boxes; and
enable access to the control elements that render the HTML content outside the one or more modal dialog boxes in response to the one or more modal dialog boxes receiving the required response to the at least one informational inquiry; and
send the generated HTML instructions to the client device, wherein the client device renders the requested web page that includes the one or more modal dialog boxes and the one or more control elements in response to receiving the generated HTML instructions from the server.

10. The system of claim 9, wherein the one or more server-side modal dialog web controls include:
a web rendering module configured to generate HTML instructions to insert a hidden child control object within the one or more modal dialog boxes; and
an event handling module configured to generate HTML instructions to intercept, using the hidden child control object, any attempts to access the disabled control elements in the requested web page until the one or more modal dialog boxes have received the required response to the informational inquiry.

11. The system of claim 10, wherein the HTML instructions to position the displayed modal dialog boxes on the screen further comprise HTML instructions to:
determine a viewable area associated with the screen at the client device; and
calculate a position for displaying the one or more modal dialog boxes relative to the viewable area, wherein the generated HTML instructions position the displayed modal dialog boxes on the screen at the calculated position.

12. The system of claim 10, wherein the access attempts that the event handling module intercepts include any keyboard actions that attempt to access the disabled control elements in the requested web page.

13. The system of claim 10, wherein the access attempts that the event handling module intercepts include any mouse actions that attempt to access the disabled control elements in the requested web page.

14. The system of claim 10, wherein the access attempts that the event handling module intercepts include any mouse actions and keyboard actions that attempt to access the disabled control elements in the requested web page.

15. A server computer system for creating and presenting a modal dialog box in a web-based application via one or more server-side web controls, the server computer system comprising:
   a computer readable storage medium stored in the server computer system that stores one or more server-side modal dialog web control controls, wherein the one or more server-side modal dialog web controls are configured to generate HTML instructions to render a requested web page that includes the modal dialog box and one or more control elements that render HTML content outside the modal dialog box, wherein the modal dialog box requires a response to at least one informational inquiry displayed in the modal dialog box, and wherein the generated HTML instructions include HTML instructions to:
   display the modal dialog box on a screen at a client device that requested the web page;
   position the displayed modal dialog box on the screen;
   disable access to the control elements in the requested web page that render the HTML content outside the modal dialog box until the modal dialog box has received the required response to the at least one informational inquiry displayed in the modal dialog box; and
   enable access to the control elements that render the HTML content outside the modal dialog box in response to the modal dialog box receiving the required response to the at least one informational inquiry.

16. The server of claim 15, wherein the one or more server-side modal dialog web controls include:
   a web rendering module configured to generate HTML instructions to insert a hidden child control object within the modal dialog box; and
   an event handling module configured to generate HTML instructions to intercept, using the hidden child control object, any attempts to access the disabled control elements in the requested web page until the modal dialog box has received the required response to the informational inquiry.

17. The server of claim 16, wherein the hidden child control object includes a transparent image object that appears behind the modal dialog box and above the requested web page, and wherein the hidden child control object visually indicates that the control elements in the requested web page have been disabled.

18. The server of claim 16, wherein the hidden child control object intercepts any keyboard actions or mouse actions that attempt to access the disable control elements in the requested web page until the modal dialog box has received the required response to the informational inquiry.

19. The server of claim 15, wherein the HTML instructions to position the displayed modal dialog boxes on the screen further comprise HTML instructions to:
   determine a viewable area associated with the screen at the client device; and
   calculate a position for displaying the modal dialog box relative to the viewable area, wherein the generated HTML instructions position the displayed modal dialog box on the screen at the calculated position.

20. The server of claim 15, wherein the one or more processors are further configured to:
   receive a message from the client device indicating that the modal dialog box has received the required response, wherein the message includes one or more control values associated with the modal dialog box and the requested web page; and
   update the web page and the control elements in the web page in response to receiving the message indicating that the modal dialog box has received the required response from the client device.

* * * * *